United States Patent [19]

Shain

[11] Patent Number: 4,582,866

[45] Date of Patent: Apr. 15, 1986

[54] FLAME RETARDANT THERMOPLASTIC MULTI-BLOCK COPOLYESTER ELASTOMERS

[75] Inventor: Albert L. Shain, Wilmington, Del.

[73] Assignee: E. I. Du Pont de Nemours and Company, Wilmington, Del.

[21] Appl. No.: 605,550

[22] Filed: Apr. 30, 1984

[51] Int. Cl.[4] ............................................. C08K 9/06
[52] U.S. Cl. .................................... 524/94; 524/341; 524/411; 524/412; 524/445; 524/447
[58] Field of Search ............... 524/411, 412, 447, 445, 524/94, 341

[56] References Cited

U.S. PATENT DOCUMENTS

| | | | |
|---|---|---|---|
| 2,531,396 | 11/1950 | Carter et al. | 524/447 |
| 3,516,959 | 6/1970 | Jonas | 524/341 |
| 3,624,024 | 11/1971 | Caldwell. | |
| 3,833,535 | 9/1974 | Wambach. | |
| 3,957,905 | 5/1976 | Sumoto et al. | 524/412 |
| 4,216,135 | 8/1980 | Finlayson | 523/507 |
| 4,374,220 | 2/1983 | Sonnenberg | 524/94 |
| 4,467,057 | 8/1984 | Dieck et al. | 524/447 |
| 4,521,557 | 6/1985 | McKenna | 524/94 |

FOREIGN PATENT DOCUMENTS 2322900 12/1978 France.

OTHER PUBLICATIONS

Southern Clay Products Bulletin: Claytone PS–#T1350.

*Primary Examiner*—Veronica P. Hoke

[57] ABSTRACT

Flame retardant thermoplastic multi-block copolyester elastomer compositions containing a bromine-containing flame retardant; antimony trioxide; and an organophilic clay which is the reaction product of at least one quaternary ammonium salt with a smectite clay.

11 Claims, No Drawings

FLAME RETARDANT THERMOPLASTIC MULTI-BLOCK COPOLYESTER ELASTOMERS

BACKGROUND OF THE INVENTION

Thermoplastic copolyester elastomers have gained acceptance in many fields because of their outstanding physical properties which are unique in relation to other thermoplastic polymers. However, copolyester elastomers are flammable and this limits their usefulness for preparing electrical parts, wire coverings, optical fiber-outer jacketing and other applications where fire retardant materials are needed.

Numerous halogenated organic compounds either alone or in combination with antimony trioxide have been tested or even recommended for use in polyester homopolymers or random copolyesters. Because of the relatively high flammability of multi-block copolyester elastomers, the ease with which such elastomers can be degraded, and the difficulty of retaining the elastomeric character of the multi-block elastomers in the presence of significant amounts of added materials, there still is a need for fully acceptable fire retardant multi-block copolyester elastomer compositions. The present invention provides flame retardant copolyester elastomer compositions which do not exhibit degradation and which substantially retain the elastomeric character of the starting polymer. Moreover, these compositions are substantially nondripping when burned.

SUMMARY OF THE INVENTION

The present invention provides a substantially nondripping flame retardant multi-block copolyester elastomer composition which comprises (a) a multi-block copolyester elastomer consisting essentially of (A) repeating high melting point blocks comprising repeating short chain ester units having the formula

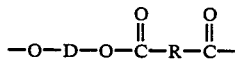

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 and has a melting point of at least 150° C., (B) repeating low melting point blocks which are derived from compounds containing hydroxyl groups or carboxyl groups or mixtures thereof having a number average molecular weight of 400–4000 and a melting point not greater than about 100° C., and (C) an amount of difunctional radicals sufficient to join repeating blocks (A) and (B) to form a multi-block copolyester elastomer, the weight ratio of (A) to (B) being from about 1:0.67 to 1:2, preferably being from 1:0.8 to 1:1.1, (b) about 20–35 parts per 100 parts of said multi-block copolyester elastomer of a bromine-containing flame retardant containing at least 65% by weight bromine and having a weight loss of not greater than 5% at 250° C. as determined by thermogravimetric analysis in air at a heating rate of 10° C./minute.

(c) about 0.20–0.75 parts per part of said bromine-containing flame retardant of antimony trioxide, and (d) 2–10 parts per 100 parts of said multi-block copolyester elastomer of an organophilic clay which is the reaction product of at least one quaternary ammonium salts with a smectite clay having an ion exchange capacity of at least 75 meq/100 g of clay, said quaternary ammonium salts having the formula

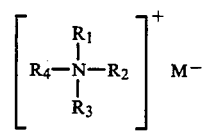

wherein M⁻ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1–22 carbon atoms in the alkyl chain.

DETAILED DESCRIPTION OF THE INVENTION

The novel flame retardant thermoplastic multi-block copolyester elastomer compositions have incorporated therein effective amounts of specified bromine-containing flame retardants, antimony trioxide and an organophilic clay. This combination of additives results in a substantially nondripping flame retardant copolyester composition that substantially retains its elastomeric character.

The thermoplastic multi-block copolyester elastomers useful in this invention consist essentially of repeating blocks of repeating short chain ester units, as described above, which have high melting points (at least 150° C.) and repeating low melting point blocks (not greater than 100° C.) which have a number average molecular weight of about 400–4000. The low melting point and high melting point blocks are joined together by difunctional radicals which, for example, can be derived by reaction of the high or low melting point blocks with diols, dicarboxylic acids, diepoxides and diisocyanates. The high melting blocks crystallize at useful service temperatures to provide physical cross-links in the multi-block elastomer while the low melting blocks provide elastomeric character. At processing temperatures, generally of the order of about 150°–250° C., the high melting point blocks melt and the polymer is molten and may be processed as a thermoplastic.

The high melting point blocks which comprise repeating short chain ester units of the formula

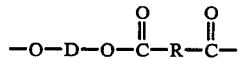

are derived from one or more low molecular weight diols, HODOH, having a molecular weight not greater than 250 and one or more dicarboxylic acids, HOOCR-COOH, having a molecular weight of not greater than 300.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2-15 carbon atoms are preferred, such as ethylene, propylene, tetramethylene, pentamethylene, 2,2 dimethyltrimethylene, hexamethylene, and decamethylene glycols, dihydroxy cyclohexane and cyclohexane dimethanol. Unsaturated diols such as butene-2-diol-1,4 can also be used, particularly in minor amounts in admixture with a saturated diol.

The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyester polymers that are stabilized, those with 8-16 carbon atoms are preferred, particularly the phenylene dicarboxylic acids, i.e., phthalic, terephthalic and isophthalic acids and their dimethyl esters.

The diol and dicarboxylic acid must be chosen to provide a melting point of at least 150° C. for a polymer having a number average molecular weight of at least 5000 and being derived exclusively from short chain ester units. Preferred high melting point blocks are derived from ethylene glycol or 1,4-butanediol by reaction with terephthalic acid alone or in admixture with up to about 30% by weight isophthalic acid or phthalic acid or mixtures thereof. Polymers based on 1,4-butanediol are especially preferred.

The low melting point blocks in said multi-block elastomers can be provided by a variety of compounds having number average molecular weights of 400-4000 which contain hydroxyl groups or carboxyl groups or mixtures thereof. Suitable compounds for forming low melting blocks include poly(alkylene oxide) glycols, low melting polyester glycols and hydrocarbon glycols or diacids.

Representative poly(alkylene oxide) glycols have a carbon-to-oxygen atomic ratio of about 2.0 4.3 and a number average molecular weight of about 400-4000 and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylene oxide) glycol having a number average molecular weight of 600-1600, especially 800-1200, and ethylene oxide-capped poly(propylene oxide) glycol having a number average molecular weight of 1500-2800 and an ethylene oxide content of 15-35% by weight.

The required low melting (i.e., below about 100° C.) polyester glycols are either polylactones or the reaction products of low molecular weight diols (i.e., less than about 250) and an aliphatic dicarboxylic acid. Representative low melting polyester glycols are obtained by reaction of diols such as ethylene glycol, 1,4-butanediol, pentanediol, hexanediol, 2,2-dimethyl-1,3-propanediol and mixtures of ethylene glycol and propylene glycol with diacids such as adipic acid, glutaric acid, pimelic acid, ruberic acid and isosebacic acid. Polylactone glycols derived from unsubstituted and substituted caprolactone or butyrolactone are also useful as low melting polyester glycols. Preferred polyester glycols include polycaprolactone glycol and poly(tetramethylene adipate) glycol having number average molecular weights of 800-2500.

Representative hydrocarbon glycol or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols to provide low melting point blocks.

The multi-block copolyester elastomers described herein can be made by procedures known in the art. Elastomers in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing elastomers by ester interchange involves heating a dicarboxylic acid or its methyl ester with a poly(alkylene oxide) glycol or hydrocarbon glycol or diacid or mixtures thereof and a molar excess of low molecular weight diol in the presence of a catalyst at about 150°-260° C. and a pressure of 0.05 to 0.5 MPa, usually ambient pressure, while distilling off water formed by esterification and/or methanol formed by ester interchange. The glycol or the diacid that provide the low melting point blocks are incorporated into the polymer through difunctional radicals provided by the dicarboxylic acid in the case of the glycols, or by the low molecular weight diols in the case of the diacids. The particular amount of difunctional radicals incorporated into the polymer will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight multi-block elastomer by distillation of the excess of short-chain diol. The second process stage is known as "polycondensation".

Additional ester interchange occurs during this polycondensation which serves to increase the molecular weight of the polymer. Best results are usually obtained if this final distillation or polycondensation is run at less than about 670 Pa, preferably less than about 250 Pa, and about 200°-280° C., preferably about 220°-260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in an amount of about 0.005 to 2.0 percent by weight based on total reactants.

Both batch and continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multi-block copolyester elastomers wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate). Ester exchange at first causes the introduction of blocks of one polyester in the other polyester chain and vice versa. When the desired multi-block polymer structure is formed the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate as described in European Pat. No. 0013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks, splitting out caprolactam and joining the blocks through ester linkages. This coupling method is described in Japanese Pat. No. 700740 (Japanese Patent Publication No. 73/4115). Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerizes on the hydroxyl groups of the high melting point ester block which groups serve as initiators. The resulting product is a relatively low molecular weight triblock polymer having the high melting point block in the middle with low melting point polycaprolactone blocks on each end. The triblock polymer is hydroxyl terminated and may be joined to give a finished product by reaction with a diepoxide such as diethylene glycol diglycidyl ether, see Japanese Patent Publication No. 83/162654.

The flame retardance of the compositions of this invention is provided by a combination of a bromine-containing flame retardant and antimony trioxide. Any bromine-containing flame retardant which has a bromine content of at least 65% by weight and exhibits a weight loss not greater than 5% at 250° C. as determined by thermogravimetric analysis in air at a heating rate of 10° C./minute can be used. These parameters insure that the flame retardant will be effective in the amounts specified and that the flame retardant will not volatilize or degrade during processing. Representative bromine-containing flame retardants include decabromodiphenyl ether, octabromodiphenyl ether, tetrabromophthalic anhydride, bis(tribromophenoxy)ethane, bis(pentabromophenoxy)ethane, hexabromocyclododecane and N,N'-ethylenebis(tetrabromophthalimide). Of these N,N'-ethylenebis(tetrabromophthalimide) is especially preferred because of its high melting point, good stability and resistance to blooming. The flame retardant, N,N'-ethylenebis(tetrabromophthalimide), can be prepared by reacting 2 moles of tetrabromophthalic anhydride with 1 mole of ethylene diamine in a suitable solvent such as N-methyl-2-pyrrolidone at about 200° C., as described in U.S. Pat. No. 4,374,220. Preferably, the diimide should be in finely divided form, usually having particles of less than about 100 mesh, when added to the copolyester elastomer. The flame retardant is used in the present compositions in amounts of about 15-35 parts per hundred parts of multi-block copolyester elastomer, preferably 20-30 parts per hundred parts of elastomer.

The antimony trioxide is incorporated in the multi-block copolyester elastomer in an amount of about 0.20-0.75 parts, preferably about 0.3-0.6 parts, per part of bromine-containing flame retardant. Any of the commercially available sources of antimony trioxide can be used in the elastomer composition.

In order to minimize or eliminate dripping when exposed to a flame, the copolyester compositions also contain about 2-10 parts, preferably 3-7 parts, per 100 parts of multi-block copolyester elastomer of an organophilic clay which is the reaction product of at least one quaternary ammonium salt with a smectite-type clay having an ion exchange capacity of at least 75 meq/100 g of clay, said quaternary ammonium salts having the formula

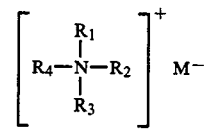

wherein M⁻ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1-22 carbon atoms in the alkyl chain.

Smectite-type clays which are useful in preparing the required organophilic clays include bentonite, montmorillonite, hectorite and saponite clays with bentonite and hectorite clays being preferred. The clays should have an ion exchange capacity of at least 75 meq/100 g of clay and preferably at least 95 meq/100 g of clay. Useful quaternary ammonium salts for modifying the clay by ion exchange must contain a cation having at least one long chain alkyl substituent having 12 to 22 carbon atoms. For reasons of economy most commercially available useful quaternary ammonium salts have one or more alkyl groups derived from hydrogenated tallow which is principally an octadecyl group. The preferred anion is the chloride ion. Representative quaternary ammonium salts which are useful in preparing the organophilic clays required by the present invention include methyl benzyl di(hydrogenated tallow) ammonium chloride,
dimethyl benzyl (hydrogenated tallow) ammonium chloride,
dimethyl di(hydrogenated tallow) ammonium chloride,
methyl tri(hydrogenated tallow) ammonium chloride, and benzyl tri(hydrogenated tallow) ammonium chloride. An especially preferred clay is bentonite treated with a mixture of 10–90% by weight dimethyl benzyl (hydrogenated tallow) ammonium chloride and dimethyl di(hydrogenated tallow) ammonium chloride.

Any method which provides uniform mixing of the flame retardant, antimony trioxide and organophilic clay with the copolyester elastomer can be used to prepare the compositions of this invention. A preferred procedure involves dry blending all of the ingredients together followed by melt blending of the dry blend in single or twin screw extruder-mixers or internal mixers such as the Farrell Continuous Mixer at a temperature above the melting point of the copolyester elastomer. The compositions can also be made by adding the flame retardant, antimony trioxide and organophilic clay to molten copolyester elastomer in a batch mixer or agitated vessel. The solid ingredients can be added separately in any order or may be dry blended prior to addition to the molten copolyester if desired.

Another convenient procedure for preparing the compositions of this invention makes use of a concentrated masterbatch of flame retardant, antimony trioxide and organophilic clay bound together by a minor amount of copolyester elastomer. Usually the concentrated masterbatch contains 15 to 35 percent by weight of elastomer which serves to bind the fire retardant ingredients into pellets. The pellets of concentrated fire retardant ingredients can be dry blended with pellets of unaltered elastomer and the pellet blend can in turn be fed directly to an injection molding machine or extruder to form fire retardant finished articles directly. The required concentrates can be prepared by mixing procedures such as those described hereinbefore.

It is usually desirable to stabilize the copolyester compositions of this invention toward heat and/or light. As antioxidants, hindered phenols or aryl amines are effective. Mixtures of these antioxidants with esters of thiodipropionic acid, mercaptides, phosphite esters and the like are useful. Stabilization against light can be obtained by compounding with UV-absorbers and/or hindered amine photostabilizers. The use of these various agents in copolyesters is known to those skilled in the art. In addition to these additives, one can add minor amounts of fillers and colorants as desired.

The compositions of this invention can be readily processed by a variety of techniques such as injection molding, compression molding and extrusion.

EXAMPLES

In the following examples, which further illustrate the present invention, parts and percentages are by weight unless otherwise indicated.

Copolyester A is prepared according to the following procedure: To a flask fitted with a distillation column and a stainless steel stirrer with a paddle cut to conform with the internal radius of the flask and positioned about 3mm from the bottom of the flask, the following starting materials are charged:

| | |
|---|---|
| dimethyl terephthalate | 62 parts |
| dimethyl isophthalate | 18 parts |
| poly(tetramethylene oxide) glycol (number average molecular weight 1000) | 70 parts |
| 1,4-butanediol | 50 parts |
| N,N'—hexamethylenebis(3,5-di-tert-butyl-4-hydroxy-hydrocinnamamide) | 2.3 parts |
| N,N'—trimethylenebis(3,5-di-tert-butyl-4-hydroxy-hydrocinnamamide) | 2.3 parts |
| tetrabutyl titanate | 0.3 parts |

The flask is placed in an oil bath at 160° C., agitated for five minutes and then the tetrabutyl titanate/1,4-butanediol solution is added. Methanol distills from the reaction mixture as the temperature is slowly raised to 250° C. over a period of one hour. When the temperature reaches 250° C., the pressure is gradually reduced to about 270 Pa within 20 minutes. The polymerization mass is agitated at 250° C. for 55–90 minutes. The condensation polymer discontinued by releasing the vacuum under nitrogen and the resulting viscous molten product is scraped from the flask in a nitrogen (water and oxygen free) atmosphere and allowed to cool. The resulting polymer has a melt index of 5.4 g/10 min, measured at 190° C. After shredding, the polymer is extruded at 200° C. to a 3–4mm strand and cut into pellets 4–5mm long. The weight ratio of high melting point blocks to low melting point blocks in this polymer is 1:0.92.

Copolyester B is a polymer containing high melting poly(butylene terephthalate) blocks and low melting poly(caprolactone) blocks in a weight ratio of 1:0.87. The polymer has a melt index of 5.2 g/10 minutes at 220° C.

Copolyester C is prepared by the procedure used for the preparation of Copolyester A except that the following ingredients and amounts are used.

| Ingredient | Parts |
|---|---|
| dimethyl terephthalate | 370.6 |
| dimethyl isophthalate | 107.6 |
| 1,4-butanediol | 332 |
| ethylene oxide-capped poly(propylene oxide) glycol, mol. wt. 2150, ethylene oxide content, 26% | 510.4 |
| 4,4'-bis(α,α-dimethylbenzyl) diphenylamine | 10 |
| tetrabutyl titanate | 2 |

The resulting polymer has a melt index of about 5 g/10 min. at 190° C. The ratio of high melting point blocks to low melting point blocks in this polymer is 1:1.04.

The following ASTM methods are employed in determining the properties of the polymer compositions prepared in the examples which follow.

| | |
|---|---|
| Tensile strength, elongation at break, 100% modulus | D412 |
| Tensile modulus at 5%, 10% and 20% strain | D638 |
| Melt flow index | D1238 |
| Flexural modulus | D790 |
| Shore D hardness | D2240 |

The flammability characteristics are determined according to the vertical burning test of the Underwriters Laboratories, Inc., Standard UL 94, 1980. For some samples, the UL 94 test was modified with reference to the conditioning of specimens. The modified specimen conditioning is a follows: set of five specimens in a circulating air oven for 2 hours at 100° C., then cooled in a dessicator over anhydrous calcium chloride for 2 hours at room temperature prior to testing. The V-0 classification indicates a higher degree of flame retardance than does a V-2 classification.

Organophilic clay is the reaction product of bentonite with a mixture of 83% by weight of dimethyl di(hydrogenated tallow) ammonium chloride and 17% by weight methyl benzyl di(hydrogenated tallow) ammonium chloride. The organophilic clay contains 60% by weight of non-volatiles at about 700° C. by thermogravimetric analysis.

EXAMPLE 1

A flame retardant composition is prepared from the ingredients and amounts shown in the following table.

| Ingredient | Parts |
| --- | --- |
| Copolyester A | 100 |
| N,N'—Ethylenebis(tetra-bromophthalimide) | 25 |
| Antimony trioxide | 12.5 |
| Black pigment, 1 part carbon black dispersed in 3 parts Copolyester A | 2.0 |
| Organophilic clay | 5.0 |

The materials are dry blended and the dry blend is compounded on a Brabender Prep Center, a heated batch sigma blade mixer. The composition is granulated and compression molded at 200° C. Test specimens of 127 mm×12.7 mm×1.6 mm and 127 mm ×12.7 mm ×3.2 mm are prepared by injection molding. Test results at specimen thicknesses of 1.6 and 3.2 mm by the standard UL-94 test indicate the composition is V-0 and does not drip while burning.

In the following table, the physical properties of the composition of this example are compared with the physical properties of Copolyester A to show the high degree to which the elastomeric properties of the starting elastomer are retained.

| | Composition of Example 1 | Copolyester A |
| --- | --- | --- |
| Stress-Strain at 23° C. | | |
| Modulus at 5%, MPa | 3.65 | 2.21 |
| Modulus at 10% MPa | 5.34 | 3.59 |
| Modulus at 20% MPa | 6.76 | 5.10 |
| Modulus at 100% MPa | 9.2 | 7.6 |
| Tensile Strength, MPa | 13.8 | 30.2 |
| Elongation at Break, % | 635 | 530 |
| Flexural Modulus | | |
| at 100° C., MPa | 22.8 | 28.0 |
| at 23° C., MPa | 80.9 | 63.5 |
| at −40° C., MPa | 216.6 | 138.1 |
| Hardness, Shore D | 46 | 40 |

EXAMPLE 2

A flame retardant composition is prepared from the ingredients and amounts shown in the following table.

| Ingredient | Parts |
| --- | --- |
| Copolyester B | 100 |
| N,N'—Ethylenebis(tetra-bromophthalimide) | 25 |
| Antimony trioxide | 12.5 |
| Black Pigment, as in Example 1 | 2.0 |

-continued

| Ingredient | Parts |
| --- | --- |
| Organophilic clay | 5.0 |

The ingredients are mixed in a heated sigma blade mixer as described in Example I. Test specimens are prepared as in Example I by compression molding at 220° C. Test specimens of 1.6 and 3.2 mm thickness are classified as V-0 by the modified UL-94 test. The specimens do not drip while burning. The composition had the following physical properties at 23° C.

| Modulus, 100%, MPa | 12.4 |
| --- | --- |
| Tensile at Break, MPa | 15.9 |
| Elongation at Break, % | 500 |

EXAMPLE 3

A flame retardant composition is prepared from the ingredients and amounts shown in the following table:

| Ingredient | Parts |
| --- | --- |
| Copolyester C | 100 |
| N,N'—Ethylenebis(tetra-bromophthalimide) | 25 |
| Antimony Trioxide | 12.5 |
| Black Pigment, as in Example 1 | 2.0 |
| Organophilic clay | 5.0 |

The materials are mixed by the procedure used in Example 1 and test specimens of 1.6 mm and 3.2 mm thickness are prepared by compression molding at 220° C. The test specimens were evaluated by the modified UL-94 test and found to be V-0, even though the thin specimens exhibited some dripping of non-flaming drops. The composition had a modulus at 100% of 9.4 MPa and an elongation at break of 200%.

I claim:

1. A substantially nondripping flame retardant copolyester elastomer composition which comprises (a) a multi-block copolyester elastomer consisting essentially of (A) repeating high melting point blocks comprising repeating short chain ester units having the formula

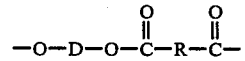

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 and has a melting point of at least 150° C., (B) repeating low melting point blocks which are derived from compounds containing hydroxyl groups or carboxyl groups or mixtures thereof and having a number average molecular weight of 400–4000 and a melting point not greater than about 100° C., and (C) an amount of difunctional radicals sufficient to join repeating blocks (A) and (B) to form a multi-block copolyester elastomer, the weight ratio of (A) to (B) being from about 1:0.67 to 1:2, (b) about 20-35 parts per 100 parts of said multi-block copolyester elastomer of a bromine-containing flame retardant containing at least 65% by weight bromine and having a weight loss of not greater than 5% at 250° C. as determined by thermogravimetric analysis in air at a heating rate of 10° C./minute, (c) about 0.20-0.75 parts per part of said bromine-coating flame retardant of antimony trioxide, and (d) about 2-10 parts per 100 parts of said multi-block copolyester elastomer of an organophilic clay which is the reaction product of at least one quaternary ammonium salt with a smectite clay having an ion exchange capacity of at least 75 meg/100 g of clay, said quaternary ammonium salt having the formula

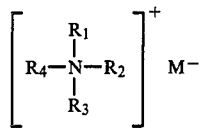

wherein M$^-$ is selected from the group consisting of chloride, bromide, iodide, nitrite, hydroxide, acetate, methyl sulfate and mixtures thereof, wherein R$_1$ is an alkyl group having 12-22 carbon atoms and wherein R$_2$, R$_3$ and R$_4$ are selected from the group consisting of hydrogen, alkyl groups containing 1-22 carbon atoms, aryl groups and aralkyl groups containing 1-22 carbon atoms in the alkyl chain.

2. A composition of claim 1 wherein the repeating high melting point blocks are derived from ethylene glycol or 1,4-butanediol and terephthalic acid or mixtures thereof containing up to about 30% by weight isophthalic acid or phthalic acid.

3. A composition of claim 1 wherein the repeating low melting point blocks are derived from poly(alkylene oxide) glycols having a carbon to oxygen atomic ratio of about 2.0-4.3 and a number average molecular weight of about 400-4000.

4. A composition of claim 3 wherein the poly(alkylene oxide) glycol is poly(tetramethylene oxide) glycol having a number average molecular weight of 600-1600.

5. A composition of claim 3 wherein the poly(alkylene oxide) glycol is ethylene oxide capped poly(propylene oxide) glycol having a number average molecular weight of 1500-2800 and an ethylene oxide content of 15-35% by weight.

6. A composition of claim 1 wherein the repeating low melting point blocks are derived from polyester glycols.

7. A composition of claim 6 wherein the polyester glycol is poly(tetramethylene adipate) glycol or polycaprolactone glycol having a number average molecular weight of from 800-2500.

8. A composition of claim 1 wherein the bromine-containing flame retardant is N,N'-ethylenebis(tetrabromophthalimide).

9. A composition of claim 1 wherein the organophilic clay is the reaction product of bentonite clay with a mixture of 10-90% by weight dimethyl benzyl (hydrogenated tallow) ammonium chloride and 10-90% by weight dimethyl di(hydrogenated tallow) ammonium chloride.

10. A composition of claim 1 wherein the multi-block copolyester elastomer consists essentially of high melting point blocks derived from 1,4-butanediol and a mixture of terephthalic acid and isophthalic acid or esters thereof, and low melting point blocks derived from poly(tetramethylene oxide) glycol having a number average molecular weight of about 800-1200, the weight ratio of high melting point blocks to low melting point blocks being from 1:0.8 to 1:1.1, about 20-35 parts of N,N'-ethylenebis(tetrabromophthalimide), and about 0.3-0.6 parts per part of said bromine-containing flame retardant of antimony trioxide and about 3-7 parts per 100 parts of said multi-block copolyester elastomer of an organophilic clay which is the reaction product of bentonite clay with a mixture of 10-90% by weight dimethyl benzyl(hydrogenated tallow) and 10-90% by weight dimethyl di(hydrogenated tallow) ammonium chloride.

11. A composition of claim 1 wherein the weight ratio of high melting point blocks to low melting point blocks is from 1:0.8 to 1:1.1.

* * * * *